(12) United States Patent
Hille-Doering

(10) Patent No.: US 8,707,247 B2
(45) Date of Patent: Apr. 22, 2014

(54) TEMPLATING MECHANISM FOR RAPID DEVELOPMENT OF GRAPHICAL EDITORS IN METAMODEL-DRIVEN APPROACHES

(75) Inventor: Reiner Hille-Doering, Karlsruhe (DE)

(73) Assignee: SAP AG, Walldorf (DE)

(*) Notice: Subject to any disclaimer, the term of this patent is extended or adjusted under 35 U.S.C. 154(b) by 1057 days.

(21) Appl. No.: 12/233,490

(22) Filed: Sep. 18, 2008

(65) Prior Publication Data
US 2010/0070947 A1 Mar. 18, 2010

(51) Int. Cl.
G06F 9/44 (2006.01)

(52) U.S. Cl.
USPC ............ 717/104; 717/109; 717/717; 717/125

(58) Field of Classification Search
USPC .......................................... 717/104, 109, 125
See application file for complete search history.

(56) References Cited

U.S. PATENT DOCUMENTS

| | | | |
|---|---|---|---|
| 2006/0074734 A1* | 4/2006 | Shukla et al. | 705/8 |
| 2006/0200799 A1* | 9/2006 | Wills et al. | 717/109 |
| 2008/0189718 A1* | 8/2008 | Gulley et al. | 718/107 |
| 2009/0007061 A1* | 1/2009 | Ben-Zvi et al. | 717/105 |

OTHER PUBLICATIONS

Moore, et al., "Eclipse Development Using the Graphical Editing Framework and the Eclipse Modeling Framework", IBM Redbooks, Feb. 2004.
Object Management Group, "Unified Modeling Language: Infrastructure", version 2.1.1., Feb. 2007.
Object Management Group, "Unified Modeling Language: Superstructure", version 2.1.1., Feb. 2007.
"Web Services Business Process Execution Language Version 2.0", OASIS Standard, OASIS, Apr. 11, 2007.

* cited by examiner

*Primary Examiner* — Li B Zhen
*Assistant Examiner* — Duy Khuong Nguyen

(57) ABSTRACT

The subject matter described herein relates to a templating system and method. In the templating system and method, each of the domain model and the graphic model are defined according to a template, and the corresponding elements of the domain model and graphic model are created. Next, a binder is created, which associates corresponding attributes in domain and graphic models. Path expressions such as XPath expressions, are used to describe locations in the domain and graphic models. These path expressions, templates, and binders are interpreted or called by a framework, which performs detailed synchronization.

13 Claims, 4 Drawing Sheets

TEMPLATING MECHANISM FOR RAPID DEVELOPMENT OF GRAPHICAL EDITORS IN METAMODEL-DRIVEN APPROACHES

FIELD

This disclosure relates generally to model-driven software development and, more particularly, to templating mechanisms for rapid development of graphical editors for business process modeling.

BACKGROUND

Software programming tools sometimes use graphical modeling tools that employ a set of graphical notation techniques to create abstract models of software systems. One such modeling tool, the Unified Modeling Language (JML), is a graphical language for visualizing, specifying, and documenting artifacts of the software. Business processing software, such as the Business Process Execution Language (BPEL), which is a language for specifying business process behavior based on Web Services, use a metamodel to define artifacts such as a combination of graphics and data of a domain model.

One approach used by graphical modeling tools is to describe the graphics by a graphic model, and the artifact itself by a domain model. Building a suitable graphical editor requires programming a "binding," or synchronization, between the domain model and the graphic model. In conventional software systems, executing the functionality thereby demands executing on many events, as well as navigation between the models via the binding code. Such an implementation is cumbersome and slow.

In a specific example, the Graphical Modeling Framework (GMF) from the Eclipse open source community uses a combination of a declarative mapping model to define the binding, and a generative approach to execute it afterwards. In other words, the binding is defined in a mapping model, and code is generated that invokes a GMF runtime. Thus, the GMF implementation is static and not extensible, since graphics themselves are not modeled.

SUMMARY

The subject matter disclosed herein provides methods and apparatus, including computer program products, for a templating mechanism for rapid development of graphical editors in a metamodel-driven approach.

In one aspect, a system for generating a model-based application is presented. In one implementation, a system includes a graphical editor for graphically modeling the application, and a template for a model of the application, the template created by a templating mechanism and defining a domain model and a graphic model of the application. The system further includes one or more binders created by the templating mechanism. Each binder associates domain model elements with graphic model elements. The system further includes a synchronization framework configured to synchronize the domain model with the graphic model by calling and interpreting the template and one or more binders based on modeling commands received and processed by the graphical editor.

In another aspect, a method of generating a model-based application is presented. In one implementation, a method includes the steps of generating a template for a domain model of the application, generating a template for a graphic model of the application, and defining a path between corresponding elements in the domain model and graphic model. The method further includes the steps of generating a binder for each corresponding element defined by the path, and interpreting each template and binder to synchronize the domain model and the graphic model.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

The subject matter described herein relates to a templating system and method. In the templating system and method, each of the domain model and the graphic model are defined according to a template, and the corresponding elements of the domain model and graphic model are created. Next, a binder is created, which associates corresponding attributes in domain and graphic models. Path expressions such as XPath expressions, are used to describe locations in the domain and graphic models. These path expressions, templates, and binders are interpreted or called by a framework, which performs detailed synchronization. Accordingly, much less code has to be programmed, leaving the complex synchronization patterns to the framework.

Figure 1:
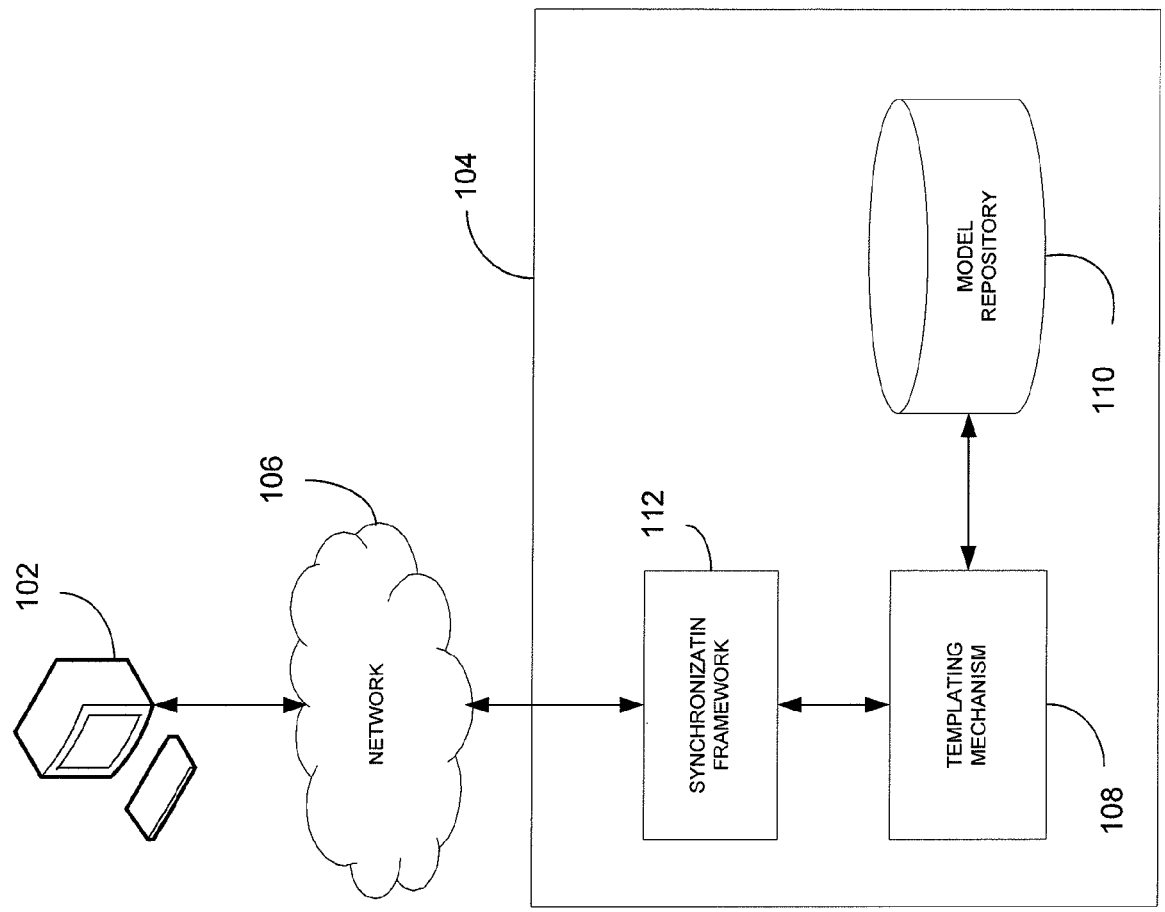
FIG. 1 illustrates a system for generating a model-based business process application.

FIG. 1 depicts an exemplary programming system 100 for rapid development of graphical editors in a metamodel-driven approach using a templating mechanism 108. The programming system 100 preferably runs on a single computing system or machine, but may also be implemented in a distributed computing environment. One implementation of a distributed computing environment includes a client system 102 coupled to a server system 104 through a network 106 (e.g., the Internet or an intranet). The client system 102 and server system 104 may be implemented as one or more processors, such as a computer, a server, a blade, and the like. Further, the programming system 100 may be implemented on two or more client systems 102 that collabotatively communicate through the network 106.

The server system 104 includes a model repository 110. The model repository 110 is preferably structured as a Meta-Object Facility (MOF) that stores data based on a metamodel. In an exemplary implementation, the model repository 110 includes a domain model that acts as a workflow gateway for data needed by a runtime system, and a graphic model that represents the graphical objects that provide a visualization of the workflow.

The server system 104 further includes a templating mechanism 108 for generating a domain template based on the domain model (i.e. original text), and a graphical template based on the graphic model (i.e. a graphical representation of the original text). The templating mechanism 108 further creates one or more binders configured to synchronize the domain template and graphical template, via path expressions that identify corresponding locations within each template. A synchronization framework 112 calls and interprets the path expressions, templates and binders to perform detailed synchronization between domain models and graphic models. Thus, the templating mechanism 108 makes writing and editing of graphical tools easier.

Figure 2:
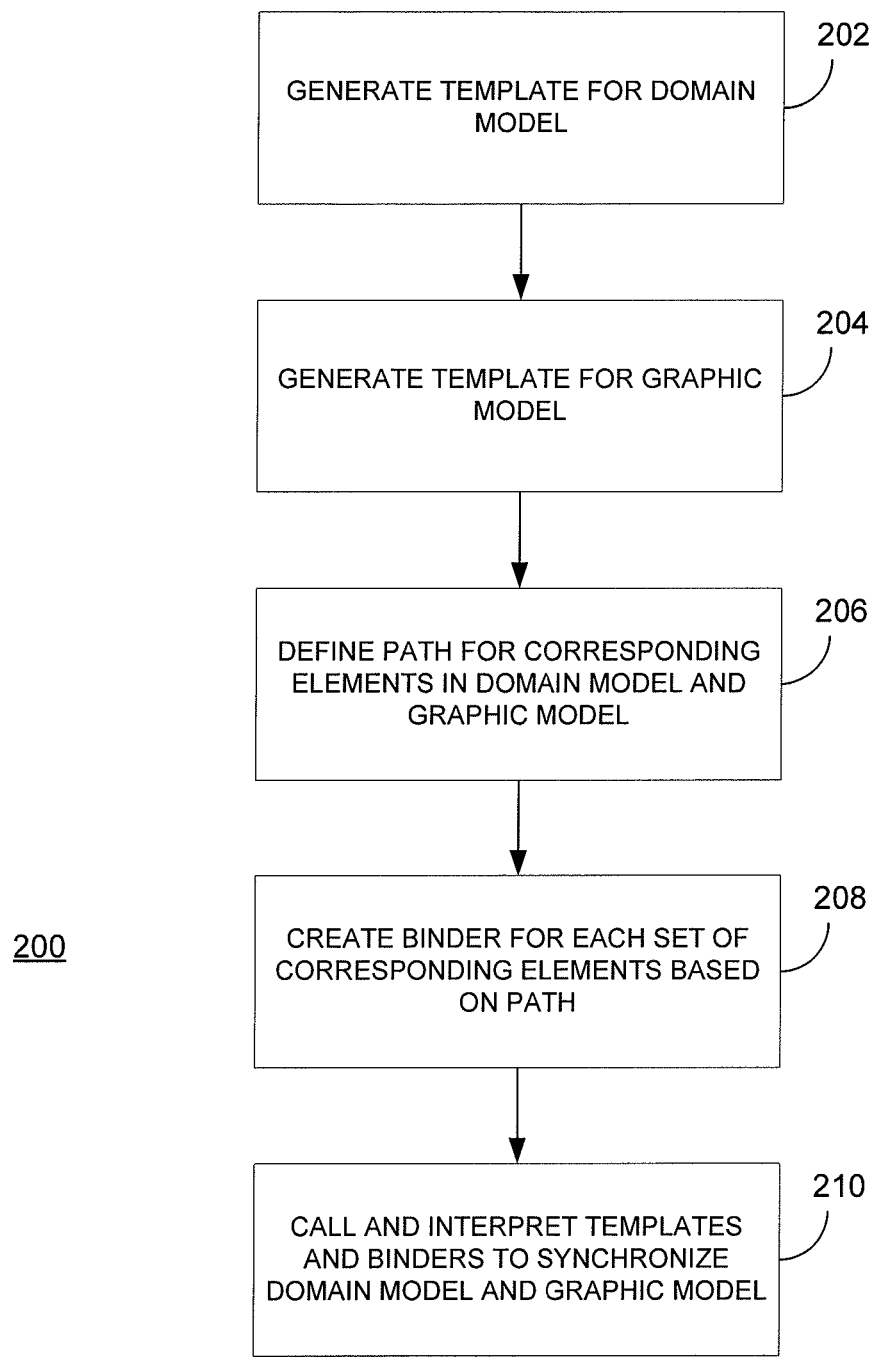
FIG. 2 illustrates a method of generating a model-based business process application.

FIG. 2 illustrates a method 200 of generating a model-based business process application. At 202 a template for a domain model is generated. The domain model defines a workflow gateway for the business processes. At 204, a template for a graphic model and for a domain model are generated, preferably in Java code, according to one implementation. However, domain templates could be created using a (generic) model editor, and graphics templates created with a graphical WYSIWYG editor. The graphic model defines a graphical execution of the workflow gateway, and is related to the domain model via text strings (attributes) and other elements. For example, the graphic model provides properties and functionalities for graphical objects, classes and attributes.

At 206, one or more paths between the domain model and the graphic model is defined for corresponding elements in the domain and the graphic models. At 208, a binder is generated or created for each path, i.e. for each set of corresponding elements between domain and graphic models. At 210, the templates and binders are called and interpreted to synchronize the domain model and graphic model at each corresponding element.

Figure 3:
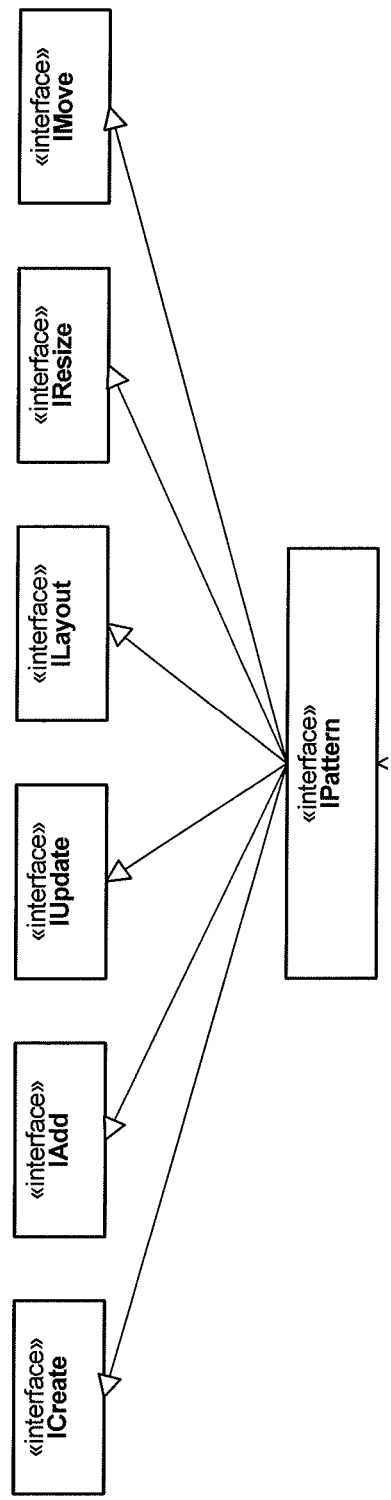
FIG. 3 illustrates a template pattern application programming interface structure.

FIG. 3 illustrates a template pattern application programming interface structure. IPattern defines a pattern for shapes grouped into a single class. The class includes interfaces: Create, add, update, layout, resize, move. These interfaces defined methods to describe the live cycle of patterns during usage in the tool. "Create" is called when the user creates a new object, e.g. a Gateway, from the Palette/Toolbox. This method creates both the relevant elements in the domain model and the corresponding graphical representation. "Add" is called to create only a graphical representation of an already existing domain object. "Update" is used to keep domain and graphics model in sync, e.g. if a property in the domain model was changed. "Layout," "resize" and "move" are typically pure graphical operations on the shapes.

The patterns act as the glue or binding between one or more domain metamodel classes and their respective graphical representation according to the graphic model. In preferred implementations, common functionality in base classes can be factored out of the template pattern for more efficient graphical editing of business processes.

Figure 4:
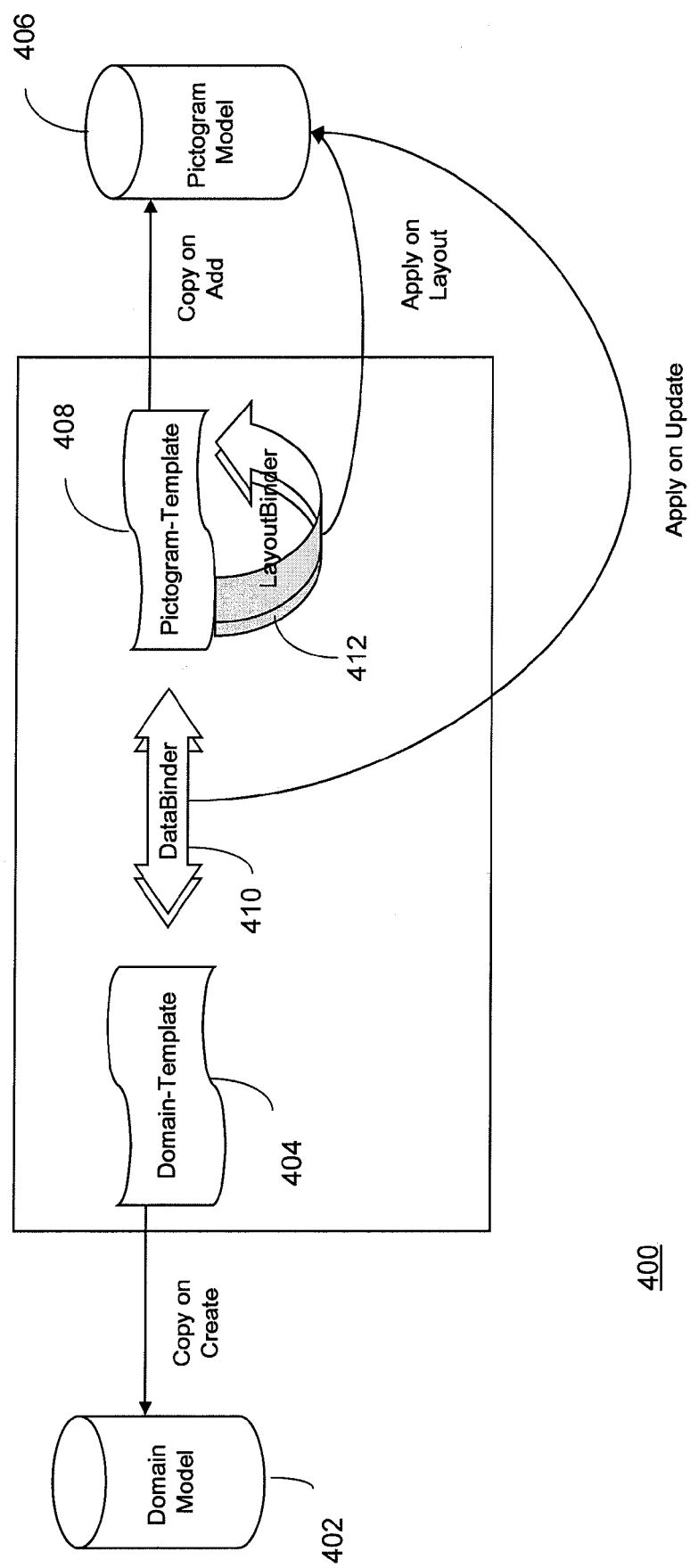
FIG. 4 illustrates one or more data binders that synchronize a domain model and graphic model.

FIG. 4 illustrates one or more data binders 410 in a graphical editor system 400 that synchronize a domain model 402 and graphic model 406. The domain model is defined by a domain template 404. In one implementation, only a snippet of the domain model is created and applied if the user clicks on a representative icon in the palette. The graphic model 406 is defined by a corresponding graphic template 408. One or more data binders 410 bind elements of the domain template 404 and graphic template 408 to create a synchronized path between the domain model 402 and graphic model 406. Further, layout binders 412 can synchronize and harmonize changes to the graphic template 408 for seamless updating of graphical elements in the graphic model 406.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Although the description above refers to a client and a server, other frameworks and architectures may be used as well. For example, the subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

As used herein, the term "user" may refer to any entity including a person or a computer.

The foregoing description is intended to illustrate but not to limit the scope of the invention, which is defined by the scope of the appended claims. Other embodiments are within the scope of the following claims.

What is claimed:

1. A system for generating an application, the system comprising:
    at least one processor; and
    at least one memory, wherein the at least one processor and the at least one memory are configured to provide functionality comprising:
        a graphical editor for graphically modeling the application;

an application programming interface providing access to at least a class of a templating mechanism, wherein the templating mechanism is configured to create at least one of a template, a domain template, and a graphics template, wherein the template describes a model of the application, the template created by the templating mechanism that creates the domain template based on a domain model of the application and creates the graphic template based on a graphic model of the application, the graphic model and the domain model linked by at least one text string;

one or more binders created by the templating mechanism, the one or more binders configured to synchronize the domain template and the graphic template, the synchronization based on a first path expression representative of a first location in the domain template and a second path expression representative of a second location in the graphic template; and a synchronization framework configured to synchronize the domain model with the graphic model by calling and interpreting the template and the one or more binders based on modeling commands received and processed by the graphical editor, wherein the domain model acts as a workflow gateway for data needed by the application and the graphic model represents graphical objects providing a visualization of the workflow.

2. The system in accordance with claim 1, wherein the templating mechanism and template are hosted by a single computing system.

3. The system in accordance with claim 1, wherein the graphical editor is hosted on a server system and accessible for use by a client system through a network.

4. The system in accordance with claim 1, wherein the domain model and the graphic model each comprise one or more attributes of the application.

5. The system in accordance with claim 1, wherein at least one of the domain model and graphic model are stored in a model repository, wherein the model repository is structured as a meta-object facility.

6. A method comprising:

accessing at least a class of a templating mechanism, wherein the templating mechanism is configured to create at least one of a template, a domain template, and a graphics template, wherein the template describes a model of the application, the template created by the templating mechanism that creates the domain template based on a domain model of the application and creates the graphic template based on a graphic model of the application, the graphic model and the domain model linked by at least one text string;

creating, by the templating mechanism, one or more binders configured to synchronize the domain template and the graphic template, the synchronization based on a first path expression representative of a first location in the domain template and a second path expression representative of a second location in the graphic template; and synchronizing the domain model with the graphic model by calling and interpreting the template and the one or more binders based on modeling commands received and processed by the graphical editor, wherein the domain model acts as a workflow gateway for data needed by the application and the graphic model represents graphical objects providing a visualization of the workflow.

7. The method in accordance with claim 6, further comprising:

providing a graphical editor to a client system; and
receiving user input for generating the application.

8. The method in accordance with claim 7, wherein each user input includes a graphic element defined according to a graphic model and a data element defined by a domain model.

9. The method in accordance with claim 8, wherein the graphic element and the data element are updated to their respective graphic model and domain model according to the template for the graphic model and the template for the domain model.

10. The method in accordance with claim 6, wherein the template for the graphic model and the template for the domain model are generated in a single computing system.

11. The method in accordance with claim 6, wherein at least one of the domain model and graphic model are stored in a model repository, wherein the model repository is structured as a meta-object facility.

12. A non-transitory computer-readable medium containing instructions to configure a processor to perform a method, the method comprising:

accessing at least a class of a templating mechanism, wherein the templating mechanism is configured to create at least one of a template, a domain template, and a graphics template, wherein the template describes a model of the application, the template created by the templating mechanism that creates the domain template based on a domain model of the application and creates the graphic template based on a graphic model of the application, the graphic model and the domain model linked by at least one text string;

creating, by the templating mechanism, one or more binders configured to synchronize the domain template and the graphic template, the synchronization based on a first path expression representative of a first location in the domain template and a second path expression representative of a second location in the graphic template; and synchronizing the domain model with the graphic model by calling and interpreting the template and the one or more binders based on modeling commands received and processed by the graphical editor, wherein the domain model acts as a workflow gateway for data needed by the application and the graphic model represents graphical objects providing a visualization of the workflow.

13. The non-transitory computer-readable medium in accordance with claim 12, wherein the method further comprises:

providing a graphical editor to a client system; and
receiving user input for generating the application.

\* \* \* \* \*